United States Patent
Christensen

[15] 3,638,046

[45] Jan. 25, 1972

[54] FET SHIFT REGISTER STAGE

[72] Inventor: Alton O. Christensen, Houston, Tex.

[73] Assignee: Shell Oil Company, New York, N.Y.

[22] Filed: Dec. 12, 1969

[21] Appl. No.: 884,397

[52] U.S. Cl. ....................307/279, 307/205, 307/214, 307/215, 307/221

[51] Int. Cl. ....................H03k 3/286, G11c 11/34

[58] Field of Search ....................307/205, 251, 279, 304, 221

[56] References Cited

UNITED STATES PATENTS

| | | | |
|---|---|---|---|
| 3,252,009 | 5/1966 | Weimer | 307/251 X |
| 3,267,295 | 8/1966 | Zuk | 307/221 X |
| 3,292,008 | 12/1966 | Rapp | 307/221 X |
| 3,363,115 | 1/1968 | Stephenson et al. | 307/221 X |
| 3,431,433 | 3/1969 | Ball et al. | 307/221 |
| 3,483,400 | 12/1969 | Washizuka et al. | 307/221 X |

OTHER PUBLICATIONS

IBM Technical Disclosure Bulletin, Vol. 9 No. 8 Jan. 1967 " MOSFET Shift Register Element" by Short

*Primary Examiner*—John S. Heyman
*Attorney*—J. H. McCarthy and Theodore E. Bieber

[57] ABSTRACT

In a shift register, a cross-coupled combination of an IGFET inverter and an IGFET NOR gate, each using a Schottky diode as a precharging device, is used in each stage to provide a fast, low-loss transfer of logic information from one stage of the shift register to the next.

5 Claims, 6 Drawing Figures

INVENTOR.
ALTON O. CHRISTENSEN
BY
Mellin, Moore & Weissenberger
ATTORNEYS

FET SHIFT REGISTER STAGE

BACKGROUND OF THE INVENTION

Shift registers for high-speed computer circuits using IGFETs (insulated gate field-effect transistors) are well known in the art. A disadvantage of the currently known circuits of this type, in which each stage is composed of two identical series-connected half stages, is that a significant voltage drop occurs in the signal transfer from each half stage to the next. This voltage drops limits the switching rate of the circuit and causes significant power losses. Furthermore, since both clock sources drive both the transfer gates and the inverters, the alternating 01 and 02 clocks must, as a practical matter, be of the same magnitude, so that design compromises are necessary.

SUMMARY OF THE INVENTION

The disadvantages of prior art IGFET shift registers can be avoided by using in each stage, a cross-coupled inverter-NOR gate combination instead of the conventional inverter-and-transfer gate half stages. The beneficial results of the invention can be further enhanced if the precharging is accomplished through barrier diodes such as Schottky diodes.

In the circuit of the invention, the cross-coupled inverter-NOR gate combination of each stage is driven by one of the alternating clocks, while the transfer gate to the next stage is driven by the other clock. Since each clock thus has a distinct function, it is possible to use different operating voltages for the two clocks. As a result, losses in the circuit can be minimized, and operating speed can be increased.

It is therefore the object of the invention to provide a low-loss, fast-acting shift register using insulated gate-switching elements and a single transfer element per stage.

It is another object of the invention to provide shift register circuits using in each stage a cross-coupled IGFET inverter-NOR gate combination with precharging means of the barrier diode type.

It is still another object of the invention to provide a circuit of the type described using separate clock supplies for the inverter-NOR gate combinations and for the transfer gates.

DESCRIPTION OF THE PREFERRED EMBODIMENT

Figures 1A, 1B:
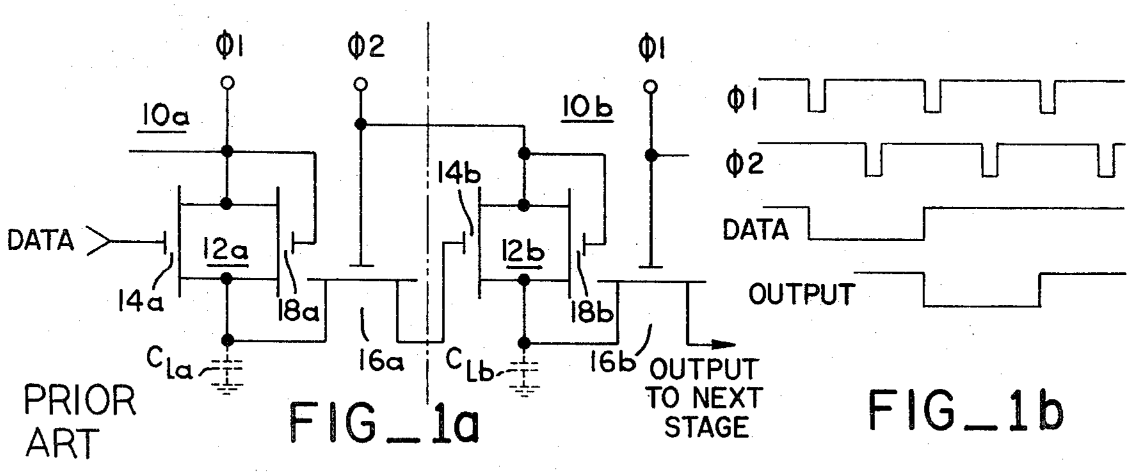
FIG. 1*a* shows a circuit diagram of a prior art IGFET shift register circuit.
FIG. 1*b* is a time-amplitude diagram illustrating the operation of the circuit of FIG. 1*a;*

The prior art technology and its functioning is shown in FIGS. 1*a* and 1*b* of the drawing. The prior art circuit consists, for each stage of the shift register, of two identical half stages 10*a*, 10*b*, each of which comprises an inverter 12 and a transfer gate 16. Each clock pulse operates the inverter of one of the half stages (e.g., 12*b* for clock 02), and also the transfer gate of the preceding half stage (e.g., 16*a*) which applies the signal to the input of that inverter. During any clock pulse, the inverter connected to that clock (e.g., 12*b* for clock 02) precharges the line capacitance $C_L$ of its output (e.g., $C_{Lb}$) and transfers the information stored on the line capacitance $C_L$ of the previous half stage (e.g., $C_{La}$) to the gate electrode capacitance of the data input IGFET 14 (e.g., 14*b*) of the inverter 12 (e.g., 12*b*) being precharged.

The prior art circuit of FIG. 1*a*, pulsed in the manner shown in FIG. 1*b*, has certain disadvantages. To begin with, a voltage division occurs between the interelectrode capacitances of the precharge gate 18 and the line capacitance $C_L$, so that the precharge voltage stored on the line capacitance $C_L$ is substantially less than the clock voltage. The resulting decreased "1" level on $C_L$ is further diminished by the voltage loss caused by the transfer gate resistance when the level stored on, say, $C_{La}$ is transferred through the transfer gate 16*a* to the gate capacitance of data input IGFET 14*b* of half stage 10*b*. The reduced signal level on the gate electrode of data input IGFET 14*b* results in a relatively high "on" resistance of data input IGFET 14*b*; and consequently, a significant amount of time is required for $C_{Lb}$ to discharge through IGFET 14*b* if the signal on the gate electrode of IGFET 14*b* is logic "1."

In addition, the signal transfer from $C_{La}$ to the gate electrode of data input IGFET 14*b* is itself delayed by the RC time constant of the "on" resistance of transfer gate 16*a* and the gate capacitance of the gate electrode of data input IGFET 14*b*.

The operation of the prior art circuit of FIG. 1*a* could be considerably speeded up by applying a high-voltage level to the gate electrode of transfer gate 16*a*. However, this is not feasible because to do so would increase the charge level on $C_{Lb}$ and require a longer discharge time for that capacitance. Furthermore, such an arrangement would require clock pulses which increase in amplitude from stage to stage, and this is of course impractical.

Figure 2A:
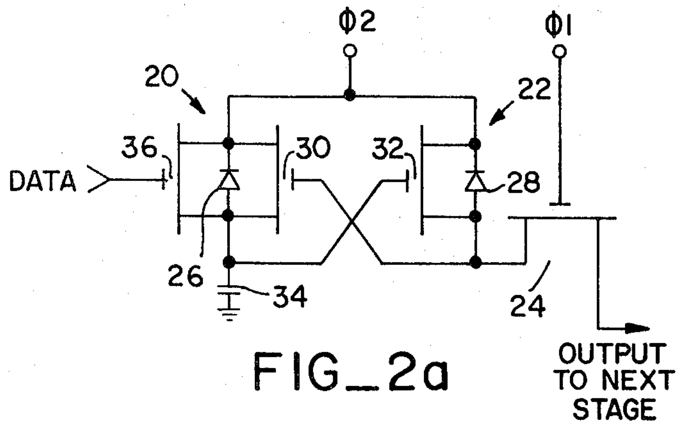
FIG. 2*a* is a circuit diagram of a single stage of a shift register constructed in accordance with the present invention.

The invention solves this problem in the manner shown in FIG. 2*a*. In that figure, each stage is shown to consist of a single circuit composed of a NOR-gate 20, an inverter 22 and a transfer gate 24. The NOR-gate 20 and the inverter 22 are precharged from a precharge clock 02, and they are cross-coupled to one another. The transfer gate 24, on the other hand, is enabled by a separate transfer clock 01 which operates only the transfer gates and can therefore differ in magnitude from the precharge clock 02.

Instead of using precharge IGFETs 18 as in the prior art circuit, the circuit of the invention preferably uses barrier diodes 26, 28 which may be of the type known as Schottky diodes. These barrier diodes have no significant internal capacitance, and consequently, do not cause a voltage division between the diode and the capacitance being precharged. As a result, the full clock voltage 02 is impressed upon the gate capacitance of control IGFET 30, the gate capacitance of control IGFET 32, and the unbalancing capacitance 34.

Figure 2B:
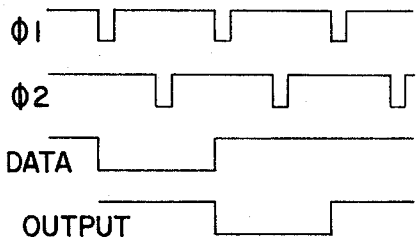
FIG. 2*b* is a time-amplitude diagram illustrating the operation of the circuit of FIG. 2*a;*

The operation of the circuit of FIG. 2*a*, when pulsed in accordance with the time-amplitude diagram of FIG. 2*b*, is as follows: upon the initiation of clock pulse 01, data is transferred from the previous stage to the gate capacitance of data input IGFET 36 of the NOR-gate 20. At the same time, the signal stored on the gate capacitance of control IGFET 30 is transferred through transfer gate 24 to the data input IGFET 36 of the next stage. This transfer can be accomplished without substantial loss or delay by using a relatively high-clock voltage for 01. Inasmuch as clock pulse 01 operates only the transfer gates, it can be made very high in amplitude so as to reduce the "on" resistance of the transfer gates 24 to a minimum.

With the transfer gates 24 once again blocked, the circuit is ready for precharge. The precharge pulse 02 precharges both the NOR-gate 20 and the inverter 22 through the diodes 26, 28 respectively. Due to the low-internal capacitance of the diodes 26, 28, the end of the 02 pulse finds capacitance 34 and the gate capacitances of control IGFETs 30 and 32 charged to essentially 02 level.

Following the cessation of the 02 pulse, a race occurs between the inverter 22 and the NOR-gate 20. If the data applied to the gate of data input IGFET 36 is logic "0," there is no conduction through the data input IGFET 36, and the outcome of the race is determined solely by the unbalancing effect of the capacitance 34. With IGFETs 30 and 32 and their associated circuitry being essentially identical, the additional capacitance of unbalancing capacitance 34 causes the gate electrode capacitance of control IGFET 32 to discharge more slowly than the gate electrode capacitance of control IGFET 30. Consequently, control IGFET 30 reaches threshold voltage first, and as soon as it does, no further discharge of the gate electrode capacitance of control IGFET 32 and of the unbalancing capacitance 34 can occur.

The gate electrode capacitance of control IGFET 30, however, can continue to discharge through the still-enabled control IGFET 32, and it eventually reaches the ground level of the now-grounded clock 02. When the next 01 pulse now enables transfer gate 24, a "0" will be written on the gate electrode capacitance of the data input IGFET 36 of the next following stage.

On the other hand, if the data input IGFET 36 of the stage of FIG. 2*a* is enabled, the gate electrode capacitance of control IGFET 32, as well as unbalancing capacitance 34, can discharge through control IGFET 30 and data input IGFET 36 in parallel. This causes the discharge path of the gate electrode capacitance of control IGFET 32 to have a much smaller resistance than the discharge path of the gate electrode capacitance of control IGFET 30; and consequently, control IGFET 32 will win the race under these conditions.

When control IGFET 32 becomes blocked as a result of its gate reaching the threshold level, the gate electrode capacitance of control IGFET 30 can no longer discharge, and as a result, the gate electrode capacitance of control IGFET 30 remains at a level somewhat less than the precharge level of clock 02 but still above threshold. Therefore, when the 01 pulse now occurs, a logic "1" signal will be transferred to the gate electrode capacitance of data input IGFET 36 of the next following stage.

It will be noted that a "1" signal on the gate of data input IGFET 36 still represents a considerably lesser voltage level than the clock level of 02. However, in the circuit of the invention, this is relatively unimportant for two reasons: first, the resulting delay, if any, comes into play only once per stage instead of twice per stage as in the prior art circuit; and secondly, unlike in the prior art circuit, the "on" resistance of the data input IGFET 36 is not determinative of the time required for the discharge of the capacitance in the circuit. The only function of the data input IGFET 36 is to offset and reverse the effect of the unbalancing capacitance 34 which normally unbalances or weights the circuit in favor of control IGFET 30 when no signal is applied to the gate electrode of data input IGFET 36.

In addition, it should be noted that there is only one lossy transfer per stage as compared to the two transfers of the prior art; and even in that one transfer, losses can be kept to a minimum by setting the level of the 01 clock pulse at a high valve. In the circuit of the invention, this can be done because the level of the 01 pulse does not affect the cross-coupled circuit driven by 02.

Although the unbalancing factor of the cross-coupled circuit has been shown herein as a capacitance 34, it will be understood that a suitable unbalance could be produced by any means such as a difference in the size of the elements, a line layout creating different line capacitances, or any other suitable expedient.

Figure 3A:
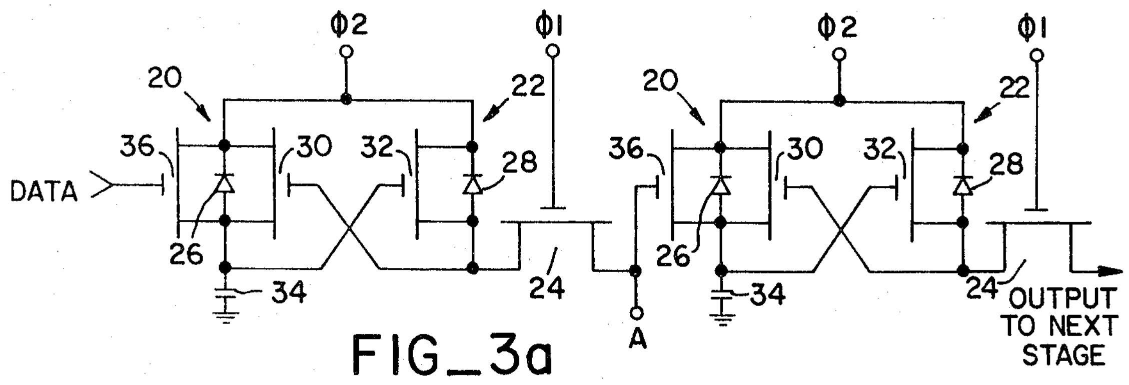
FIG. 3*a* is a circuit diagram of a shift register including several stages of the type shown in FIG. 2*a*.
Figure 3B:
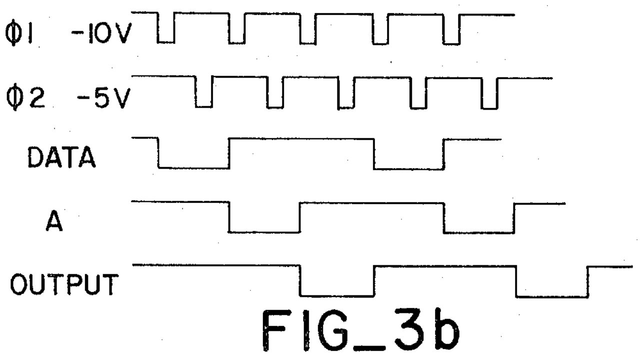
FIG. 3*b* is a time-amplitude diagram illustrating the operation of the circuit of FIG. 3*a*.

FIG. 3 illustrates the application of the circuit of FIG. 2*a* to a shift register. In FIG. 3*a*, the circuit is shown as a succession of stages each constructed in accordance with FIG. 2*a*. Although only two stages are shown in FIG. 3*a*, it will be understood that there may be any number connected in series. A comparison of the "DATA," "A," and "OUTPUT" curves in FIG. 3*b* illustrates how a data pulse is shifted successively from one stage junction to the next.

The 10-volt and 5-volt levels of 01 and 02, respectively which are indicated in FIG. 3*b*, are of course matters of example and may be varied as the exigencies of a particular apparatus may dictate.

I claim:

1. A shift register stage comprising:
a. data input means;
b. data output means; and
c. means interconnecting said data input and output means in such a manner as to continually cyclically transfer data appearing at said data input means to said data output mean;
d. said interconnecting means comprising:
   i. prechargeable inverter means and NOR gate means precharged from a common source of first clock pulses, said inverter means and NOR gate means being cross-connected so that the output of said inverter means is one of the inputs of said NOR gate means, and the output of said NOR gate means is the input of said inverter means;
   ii. said data input means constituting a second input of said NOR gate means;
   iii. transfer gate means connected between said output of said inverter means and said data output means; and
   iv. a source of second clock pulses alternating with said first clock pulses connected to said transfer gate means to enable the same in alternation with the precharging of said inverter and NOR gate means.

2. A shift register stage according to claim 1, further comprising means for unbalancing said interconnecting means.

3. A shift register stage according to claim 1, in which the precharging of said inverter and NOR gate means is accomplished through barrier diode means.

4. A shift register stage according to claim 1, in which the amplitude of said first clock pulses is substantially different from the amplitude of said second clock pulses.

5. A shift register stage comprising:
a. inverter means and at least two-input NOR gate means using insulated gate field-effect transistors as active elements;
b. one of the inputs of said NOR gate means being a data input element;
c. means cross-coupling the output of the inverter means with the other input of the NOR gate means and the output of the NOR gate means with the input of the inverter means to operate in a race mode; and
d. means to unbalance said cross-coupled inverter and NOR gate means so as to weight said race in favor of one of said inverter and NOR gate means if a logic "1" signal is applied to the data input element, and in favor of the other if a logic "0" signal is applied to said data input element.

* * * * *